United States Patent
Christensen (10) Patent No.: US 10,606,646 B1
(45) Date of Patent: Mar. 31, 2020

(54) SYSTEMS AND METHODS FOR CREATING A DATA VOLUME FROM WITHIN A SOFTWARE CONTAINER AND INITIALIZING THE DATA VOLUME WITH DATA

(71) Applicant: Veritas Technologies LLC, Mountain View, CA (US)

(72) Inventor: Aaron Christensen, Apple Valley, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 316 days.

(21) Appl. No.: 15/456,702

(22) Filed: Mar. 13, 2017

(51) Int. Cl.
*G06F 9/44* (2018.01)
*G06F 9/50* (2006.01)
*G06F 9/48* (2006.01)

(52) U.S. Cl.
CPC .......... *G06F 9/5016* (2013.01); *G06F 9/4843* (2013.01)

(58) Field of Classification Search
CPC .......................................................... G06F 9/44
See application file for complete search history.

(56) References Cited

U.S. PATENT DOCUMENTS

| 5,956,028 | A | * | 9/1999 | Matsui | ................. | G06F 3/1454 345/419 |
| 7,702,866 | B2 | * | 4/2010 | Beardsley | .......... | G06F 11/2069 711/162 |
| 8,266,616 | B1 | | 9/2012 | Jacquot et al. | | |
| 8,869,140 | B2 | | 10/2014 | Todorova | | |
| 9,075,638 | B2 | | 7/2015 | Barnett et al. | | |
| 9,176,720 | B1 | | 11/2015 | Day-Richter et al. | | |
| 9,203,862 | B1 | * | 12/2015 | Kashyap | ............... | H04L 63/145 |
| 9,213,541 | B2 | | 12/2015 | Araya et al. | | |
| 9,256,467 | B1 | | 2/2016 | Singh et al. | | |
| 9,367,305 | B1 | | 6/2016 | Kumar | | |
| 9,396,061 | B1 | | 7/2016 | Nair | | |
| 9,785,643 | B1 | * | 10/2017 | Patil | ..................... | G06F 3/0608 |

(Continued)

OTHER PUBLICATIONS

Kasireddy, Preethi, "A Beginner-Friendly Introduction to Containers, VMs and Docker," accessed at https://medium.freecodecamp.org/a-beginner-friendly-introduction-to-containers-vms-and-docker-79a9e3e119b, published on Mar. 4, 2016, pp. 21.

(Continued)

*Primary Examiner* — Jae U Jeon
(74) *Attorney, Agent, or Firm* — FisherBroyles, LLP (57) ABSTRACT

The disclosed computer-implemented method for creating a data volume from within a software container and initializing the data volume with data may include (i) running, from a volume creation container image, a volume creation container that isolates user space of the volume creation container from other processes while sharing kernel space with the other processes, (ii) creating a new data volume from within the volume creation container, and (iii) executing, from within the volume creation container, a run command to run a data initialization container from the volume creation container image and mount the new data volume to a target mount point in the data initialization container, the data initialization container executing a data initialization command to copy data to the new data volume. Various other methods, systems, and computer-readable media are also disclosed.

20 Claims, 6 Drawing Sheets

(56) References Cited

U.S. PATENT DOCUMENTS

| | | | |
|---|---|---|---|
| 9,888,067 | B1 | 2/2018 | Yemini et al. |
| 9,983,891 | B1 | 5/2018 | Christensen |
| 10,073,974 | B2 | 9/2018 | Hwang et al. |
| 10,127,030 | B1* | 11/2018 | Mortman .................. G06F 8/64 |
| 10,169,023 | B2 | 1/2019 | Ciano et al. |
| 10,360,053 | B1 | 7/2019 | Christensen et al. |
| 2002/0069399 | A1 | 6/2002 | Miloushey et al. |
| 2002/0069400 | A1 | 6/2002 | Miloushev et al. |
| 2002/0120924 | A1 | 8/2002 | Miloushev et al. |
| 2003/0056205 | A1 | 3/2003 | Miloushev et al. |
| 2003/0135850 | A1 | 7/2003 | Miloushev et al. |
| 2004/0148367 | A1 | 7/2004 | Takano |
| 2005/0246357 | A1 | 11/2005 | Geary et al. |
| 2006/0005189 | A1* | 1/2006 | Vega ..................... G06F 9/4856 718/1 |
| 2008/0028379 | A1* | 1/2008 | Stichnoth .............. G06F 9/4484 717/151 |
| 2009/0077422 | A1* | 3/2009 | Khaladkar .......... G06F 11/3684 714/33 |
| 2009/0210869 | A1 | 8/2009 | Gebhart |
| 2009/0265712 | A1 | 10/2009 | Herington |
| 2011/0047525 | A1 | 2/2011 | Castellanos |
| 2011/0191537 | A1* | 8/2011 | Kawaguchi ........... G06F 3/0605 711/114 |
| 2011/0197188 | A1 | 8/2011 | Srinivasan |
| 2012/0005153 | A1 | 1/2012 | Ledwich et al. |
| 2014/0181816 | A1 | 6/2014 | Muller |
| 2014/0201374 | A1 | 7/2014 | Ashwood-Smith |
| 2015/0032688 | A1* | 1/2015 | Dayon .................. G06F 16/951 707/609 |
| 2015/0120928 | A1 | 4/2015 | Gummaraju |
| 2015/0269006 | A1 | 9/2015 | Caufield |
| 2015/0310209 | A1 | 10/2015 | Zhang |
| 2015/0363181 | A1 | 12/2015 | Alberti |
| 2016/0098285 | A1 | 4/2016 | Davis et al. |
| 2016/0162320 | A1 | 6/2016 | Singh |
| 2016/0171222 | A1* | 6/2016 | Panchbudhe ......... G06F 21/602 713/193 |
| 2016/0182315 | A1 | 6/2016 | Salokanto et al. |
| 2016/0217176 | A1* | 7/2016 | Haviv ................... G06F 3/0649 |
| 2016/0359955 | A1* | 12/2016 | Gill ..................... H04L 67/1097 |
| 2016/0378518 | A1 | 12/2016 | Antony |
| 2017/0060605 | A1 | 3/2017 | Huang et al. |
| 2017/0083541 | A1* | 3/2017 | Mann .................... G06F 16/119 |
| 2017/0115977 | A1 | 4/2017 | Kim |
| 2017/0154017 | A1 | 6/2017 | Kristiansson et al. |
| 2017/0228246 | A1 | 8/2017 | Kotha |
| 2017/0235609 | A1 | 8/2017 | Wires |
| 2017/0242617 | A1 | 8/2017 | Walsh |
| 2017/0249469 | A1 | 8/2017 | Goyal et al. |
| 2017/0264684 | A1 | 9/2017 | Spillane |
| 2017/0277524 | A1 | 9/2017 | Bhat et al. |
| 2017/0279797 | A1 | 9/2017 | Cross, Jr. |
| 2017/0315795 | A1 | 11/2017 | Keller |
| 2017/0322966 | A1 | 11/2017 | Tran |
| 2017/0337054 | A1 | 11/2017 | Parees |
| 2017/0344292 | A1 | 11/2017 | Sterin |
| 2018/0004570 | A1 | 1/2018 | Maupu |
| 2018/0046457 | A1 | 2/2018 | Branca |
| 2018/0060402 | A1 | 3/2018 | Fabjanski et al. |
| 2018/0129479 | A1 | 5/2018 | McPherson et al. |
| 2018/0157505 | A1* | 6/2018 | Kairali ................ G06F 11/0754 |
| 2018/0336113 | A1 | 11/2018 | Asawa et al. |

OTHER PUBLICATIONS

Apache Mesos, http://mesos.apache.org, last accessed Jan. 25, 2017.
AWS Lambda, https://aws.amazon.com/lambda/, last accessed Jan. 25, 2017.
Docker container support, last accessed Jan. 25, 2017.
Dray—Docker Workflow Engine, http://dray.it/, last accessed Jan. 25, 2017.
Docker ETL Rest server github, https://github.com/bmamlin/docker-etl-rest-server, last accessed Jan. 25, 2017.
Docker Nifi github, https://github.com/jdye64/docker-nifi, last accessed Jan. 25, 2017.
Mesos/Chronos github, https://github.com/mesos/chronos, last accessed Jan. 25, 2017.
Apache Nifi for Docker, https://github.com/apiri/dockerfile-apache-nifi, last accessed Jan. 25, 2017.
Coho Data, https://www.cohodata.com/intel, last accessed Jan. 25, 2017.
Iron.io, https://www.iron.io/, last accessed Jan. 25, 2017.
Jenkins and Docker, https://www.cloudbees.com/continuous-delivery/jenkins-docker, last accessed Jan. 25, 2017.
Pachyderm.io, https://www.pachyderm.io/, last accessed Jan. 25, 2017.
Syncsort ETL, last accessed Jan. 25, 2017.
Talend and Docker, last accessed Jan. 25, 2017.
What is Docker?, https://www.docker.com/what-docker, last accessed Jan. 25, 2017.
Docker Swarm product overview, https://www.docker.com/products/docker-swarm, last accessed Feb. 28, 2017.
Kubernetes Basics, https://kubernetes.io/docs/tutorials/kubernetes-basics/, last accessed Feb. 28, 2017.
Attach a volume to a container while it is running; http://jpetazzo.github.io/2015/01/13/docker-mount-dynamic-volumes/, as accessed Feb. 23, 2017 (Jan. 13, 2015); Github.
Manage data in containers; https://docs.docker.com/engine/tutorials/dockervolumes/#/backup-restore-or-migrate-data-volumes, as accessed Feb. 23, 2017 (Sep. 3, 2016); Docker.
Docker—Data Volumes and Data Containers (4); http://www.tricksofthetrades.net/2016/03/14/docker-data-volumes/, as accessed Feb. 23, 2017 (Mar. 14, 2016); Tricks of the Trades.
Understanding Volumes in Docker; http://container-solutions.com/understanding-volumes-docker/, as accessed Feb. 23, 2017 (Jul. 6, 2015); Container Solutions Amsterdam.
Docker mounting volumes on host; http://stackoverflow.com/questions/25311613/docker-mounting-volumes-on-host, as accessed Feb. 23, 2017 (Aug. 14, 2014); stackoverflow.
Understand images, containers, and storage drivers; https://docs.docker.com/engine/userguide/storagedriver/imagesandcontainers/, as accessed Feb. 23, 2017 (Nov. 7, 2015); Docker.
A Not Very Short Introduction to Docker; https://blog.jayway.com/2015/03/21/a-not-very-short-introduction-to-docker/, as accessed Feb. 23, 2017 (Mar. 21, 2015); jayway.
Use data volume containers; https://getcarina.com/docs/tutorials/data-volume-containers/, as accessed Feb. 23, 2017 (Oct. 23, 2015); Rackspace.
What is the differences between Data Scientist Workbench and Knowledge Anyhow Workbench; http://support.datascientistworkbench.com/knowledgebase/articles/738753-what-is-the-differences-between-data-scientist-wor, as accessed Feb. 14, 2017 (Jan. 13, 2016); Big Data University.
Rodeo Basics; http://rodeo.yhat.com/docs/, as accessed Feb. 14, 2017 (Nov. 14, 2015); Rodeo.
Extract, transform, load; https://en.wikipedia.org/wiki/Extract,_transform,_load, as accessed Feb. 14, 2017 (Aug. 15, 2004); Wikipedia.
What is Docker; http://searchitoperations.techtarget.com/definition/Docker; as accessed Jan. 28, 2017.
Platform as a Service; https://en.wikipedia.org/wiki/Platform_as_a_service; as accessed Jan. 28, 2017.
What is Scale out Storage; http://whatis.techtarget.com/definition/scale-out-storage; as accessed Jan. 28, 2017.
Real-Time Data Analysis with Kubernetes, Redis, and BigQuery; https://cloud.google.com/solutions/real-time/kubernetes-redis-bigquery; as accessed Jan. 28, 2017.
Operating-system-level virtualization; https://en.wikipedia.org/wiki/Operating-system-level_virtualization; as accessed Jan. 28, 2017.
Advanced Analytics Products; http://www.sas.com/en_us/software/analytics.html#view-all-products; as accessed Jan. 31, 2017.
Containerized Cloud Analytics—SAS Analytics for Containers; http://www.sas.com/en_us/software/analytics-for-containers.html; as accessed Jan. 31, 2017.
Container Cluster; https://cloud.google.com/container-engine/docs/clusters/#what_is_a_container_cluster; as accessed Jan. 31, 2017.

(56) References Cited

OTHER PUBLICATIONS

Object Storage; https://en.wikipedia.org/wiki/Object_storage; as accessed Jan. 30, 2017.
Clustered file system; https://en.wikipedia.org/wiki/Clustered_file_system; as accessed Jan. 30, 2017.
Ryan Schroeder et al.; Systems and Methods for Automatically Linking Data Analytics to Storage; U.S. Appl. No. 15/428,134, filed Feb. 8, 2017.
Wikipedia; Operating-system-level virtualization; https://en.wikipedia.org/wiki/Operating-system-level_virtualization, as accessed on Feb. 14, 2017.
Plugins_volume.md; https://github.com/docker/docker/blob/master/docs/extend/plugins_volume.md, as accessed on Feb. 14, 2017.
Ryan Schroeder et al.; Systems and Methods for Performing Storage Location Virtualization; U.S. Appl. No. 15/432,614, filed Feb. 14, 2017.
Kirk Searls et al.; Systems and Methods for Building an Extract, Transform, Load Pipeline; U.S. Appl. No. 15/431,971, filed Feb. 14, 2017.
Kang et al., "Container and Microservice Driven Design for Cloud Infrastructure DevOps", IEEE International Conference on Cloud Engineering (IC2E), 2016, pp. 202-211.

* cited by examiner

SYSTEMS AND METHODS FOR CREATING A DATA VOLUME FROM WITHIN A SOFTWARE CONTAINER AND INITIALIZING THE DATA VOLUME WITH DATA

In the past, large scale computing projects were limited to individuals and enterprises that owned large physical data centers with towering racks of computers. Now, distributed computing allows anyone with the resources to buy server space to run as many instances of their preferred computing device as desired. Further efficiency improvements have been introduced in the form of application containers that allow administrators to run applications without requiring the resources necessary to simulate an entire virtualized operating system for each virtualized application. Containers reduce the processing requirements for each application, allowing greater numbers of applications to be run on the same host. Container volumes, which provide persistent storage of data outside of containers, further allow for convenient management of container data and sharing of data between multiple containers and across hosts.

However, container volumes have limited flexibility in how they are created and initialized with data. An application running in a container is not able to both create a new volume to be used by another container and also directly initialize the volume with data. The instant disclosure, therefore, identifies and addresses a need for systems and methods for creating a data volume from within a software container and initializing the data volume with data.

SUMMARY

As will be described in greater detail below, the instant disclosure describes various systems and methods for creating a data volume from within a software container and initializing the data volume with data by running a volume creation container from a container image to create a new data volume and utilizing a run command within the volume creation container to run, from the same container image, a data initialization container to initialize the newly created data volume with data.

In one embodiment, a computer-implemented method for creating a data volume from within a software container and initializing the data volume with data may include (i) running, from a volume creation container image, a volume creation container that isolates user space of the volume creation container from other processes while sharing kernel space with the other processes, (ii) creating a new data volume from within the volume creation container, and (iii) executing, from within the volume creation container, a run command to run a data initialization container from the volume creation container image and mount the new data volume to a target mount point in the data initialization container, the data initialization container executing a data initialization command to copy data to the new data volume.

In some embodiments, the method may further include (i) determining, from within the volume creation container, a container identifier for the volume creation container, and (ii) inspecting, from within the volume creation container, the volume creation container image based on the container identifier to obtain an image identifier for the volume creation container image. Executing the run command to run the data initialization container from the volume creation container image may include utilizing the image identifier to locate the volume creation container image. In various embodiments, running the volume creation container may further include running a script within the volume creation container. The script may execute the run command to run the data initialization container from the volume creation container image and mount the new data volume to the target mount point in the data initialization container. Running the data initialization container may further include running another instance of the script within the data initialization container.

In some embodiments, the data initialization container may be run while the volume creation container is running. Creating the new data volume may include executing, from within the volume creation container, a volume creation command. Executing the run command to run the data initialization container from the volume creation image and mount the new data volume to the target mount point in the data initialization container may further include passing a parameter that is utilized by the data initialization container to execute the data initialization command. The parameter may be utilized by the data initialization container to execute the data initialization command instead of a volume creation command. The data copied to the new data volume may include data included in the volume creation container image.

In at least one embodiment, the computer-implemented method may further include executing, from within the volume creation container or the data initialization container, an additional run command to run a data copying container from the volume creation container image and mount the new data volume to a target mount point in the data copying container, the data copying container executing a copy command to copy additional data from a data source outside the data copying container to the new data volume. Executing the additional run command to run the data copying container from the volume creation container image and mount the new data volume to the target mount point in the data copying container may further include passing a parameter that is utilized by the data copying container to execute the copy command.

In one example, a system for creating a data volume from within a software container and initializing the data volume with data may include several modules stored in memory, including a (i) running module, stored in memory, that runs, from a volume creation container image, a volume creation container that isolates user space of the volume creation container from other processes while sharing kernel space with the other processes, (ii) a creation module, stored in memory, that creates a new data volume from within the volume creation container, (iii) an executing module, stored in memory, that executes, from within the volume creation container, a run command to run a data initialization container from the volume creation container image and mount the new data volume to a target mount point in the data initialization container, the data initialization container executing a data initialization command to copy data to the new data volume, and (iv) at least one physical processor that executes the running module, the creation module, and the executing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) run, from a volume creation container image, a volume creation container that isolates user space of the volume creation container from other processes while sharing kernel space with the other processes, (ii) create a new data volume from within the volume creation container, and (iii) execute, from within the volume creation container, a run command to run a data initialization container from the volume creation container image and mount the new data volume to a target mount point in the data initialization container, the data initialization container executing a data initialization command to copy data to the new data volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for creating a data volume from within a software container and initializing the data volume with data. As will be explained in greater detail below, the systems and methods described herein may run a volume creation container from a container image to create a new data volume. A run command may then be executed within the volume creation container to run, from the same volume creation container image, a data initialization container and mount the newly created data volume in the data initialization container. A data initialization command may then be run within the data initialization container to initialize the newly created data volume with data.

By enabling the data volume to be created and initialized with data using the same volume creation container image, the systems and methods described herein may facilitate efficient volume creation without requiring a user to use additional container images to initialize new volumes with data. The data volumes may be created and initialized with data without using routines requiring multiple runtime dependencies or manual mounting of existing volumes within a separate container. Accordingly, the described systems and methods may facilitate dynamic and efficient volume creation for use in container-based environments.

The following will provide, with reference to FIGS. 1-2 and 4-6, detailed descriptions of exemplary systems for creating a data volume from within a software container and initializing the data volume with data. Detailed descriptions of corresponding computer-implemented methods will also be provided in connection with FIG. 3.

Figure 1:
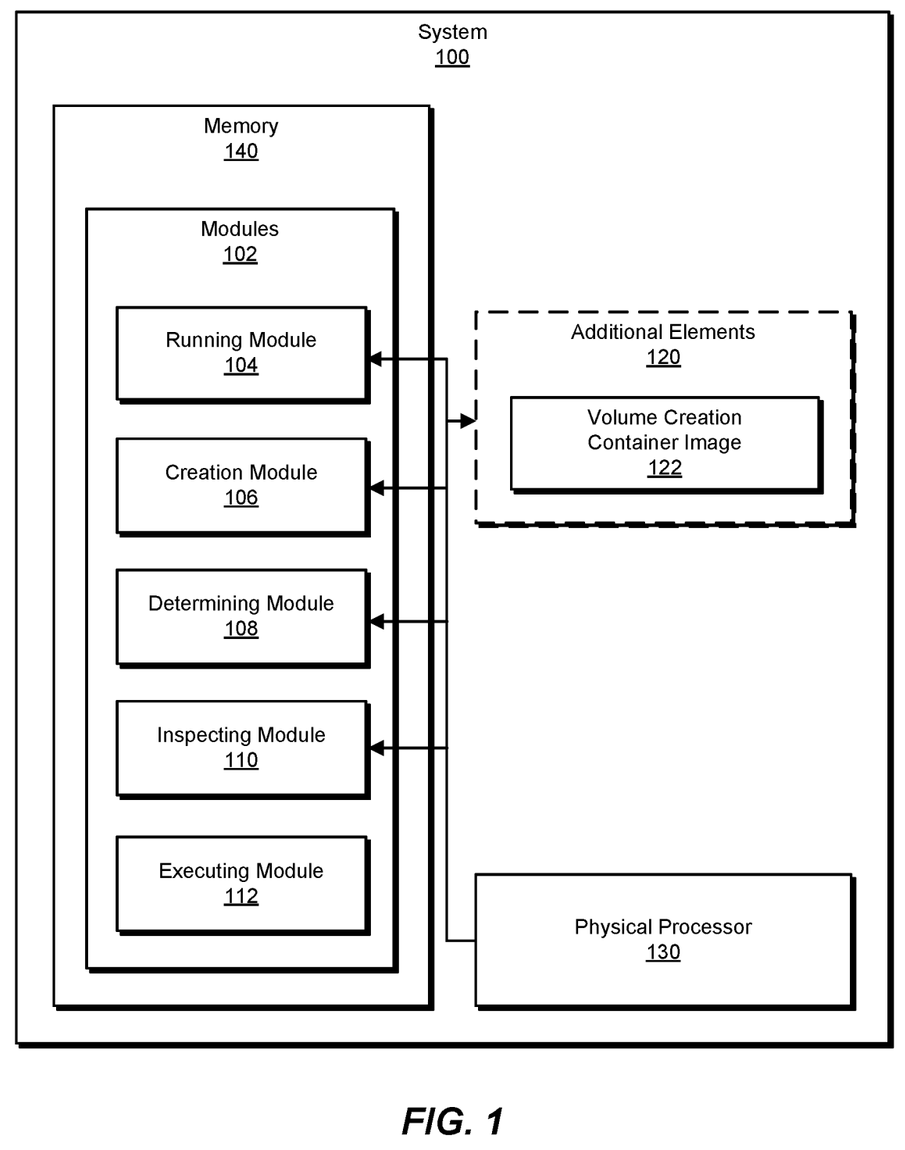
FIG. 1 is a block diagram of an exemplary system for creating a data volume from within a software container and initializing the data volume with data.

FIG. 1 is a block diagram of an exemplary system 100 for creating a data volume from within a software container and initializing the data volume with data. As illustrated in this figure, exemplary system 100 may include one or more modules 102 for performing one or more tasks. As will be explained in greater detail below, modules 102 may include a running module 104 that runs, from a volume creation container image, a volume creation container that isolates user space of the volume creation container from other processes while sharing kernel space with the other processes.

The term "container," as used herein, generally refers to any type of virtual environment (e.g., DOCKER container environment) that does not include an entire operating system but does include enough resources to execute at least one application. In some embodiments, the resources and/or processes within a container may be isolated from resources and/or processes outside the application container and/or the application container may have a default configuration that specifies that communication from the application container to outside resources and/or processes must pass through the kernel of the application container's host. Containers may each be run from a separate container image that includes all of the necessary files and parameters. In at least one embodiment, a layer-based union file system (e.g., UnionFS) may be used to form the building blocks for containers. The term "container image," as used herein, generally refers to any type of virtual filesystem and parameters that are utilized by a container at runtime. In at least one embodiment, a container image may be static and stateless.

The term "kernel," as used herein, generally refers to any part of a computing system's operating system that manages I/O requests from applications and/or translates I/O requests into instructions for various hardware components of a computing system such as a central processing unit.

Additionally, exemplary system 100 may include a creation module 106 that creates a new data volume from within the volume creation container. The term "volume," as used herein, generally refers to any type of specially-designated directory or file that may be directly mounted within one or more containers. In at least one embodiment, any number of volumes may be mounted into a container, and multiple containers may share a data volume or multiple data volumes. For example, one or more containers having separate addresses may share a common data volume that is located within a container host. A volume may reside outside of local storage area on a host that includes one or more address spaces for containers, and data in the volume may persist after a container to which the volume is mounted is deleted. In some embodiments, a volume may bypass a union file system utilized by the containers in which the volume is mounted.

The term "host," as used herein, generally refers to any computing system capable of hosting one or more application containers. In some embodiments, a host may include physical hardware. Additionally or alternatively, a host may include a virtualized computing system. In some embodiments, a host may be a remotely managed server (i.e., on the cloud).

Exemplary system 100 may also include a determining module 108 that determines, from within the volume creation container, a container identifier for the volume creation container. Exemplary system 100 may further include an inspecting module 110 that inspects, from within the volume creation container, the volume creation container image based on the container identifier to obtain an image identifier for the volume creation container image. Exemplary system 100 may additionally include an executing module 112 that executes, from within the volume creation container, a run command to run a data initialization container from the volume creation container image and mount the new data volume to a target mount point in the data initialization container, the data initialization container executing a data initialization command to copy data to the new data volume. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, exemplary system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate creating a data volume from within a software container and initializing the data volume with data. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, exemplary system 100 may also include one or more additional elements 120, such as volume creation container image 122. Volume creation container image 122 generally represents any type or form of container image for creating a data volume in a container-based environment and initializing the volume with data. Volume creation container image 122 may include instructions to generate a plurality of containers having different functionality.

Figure 2:
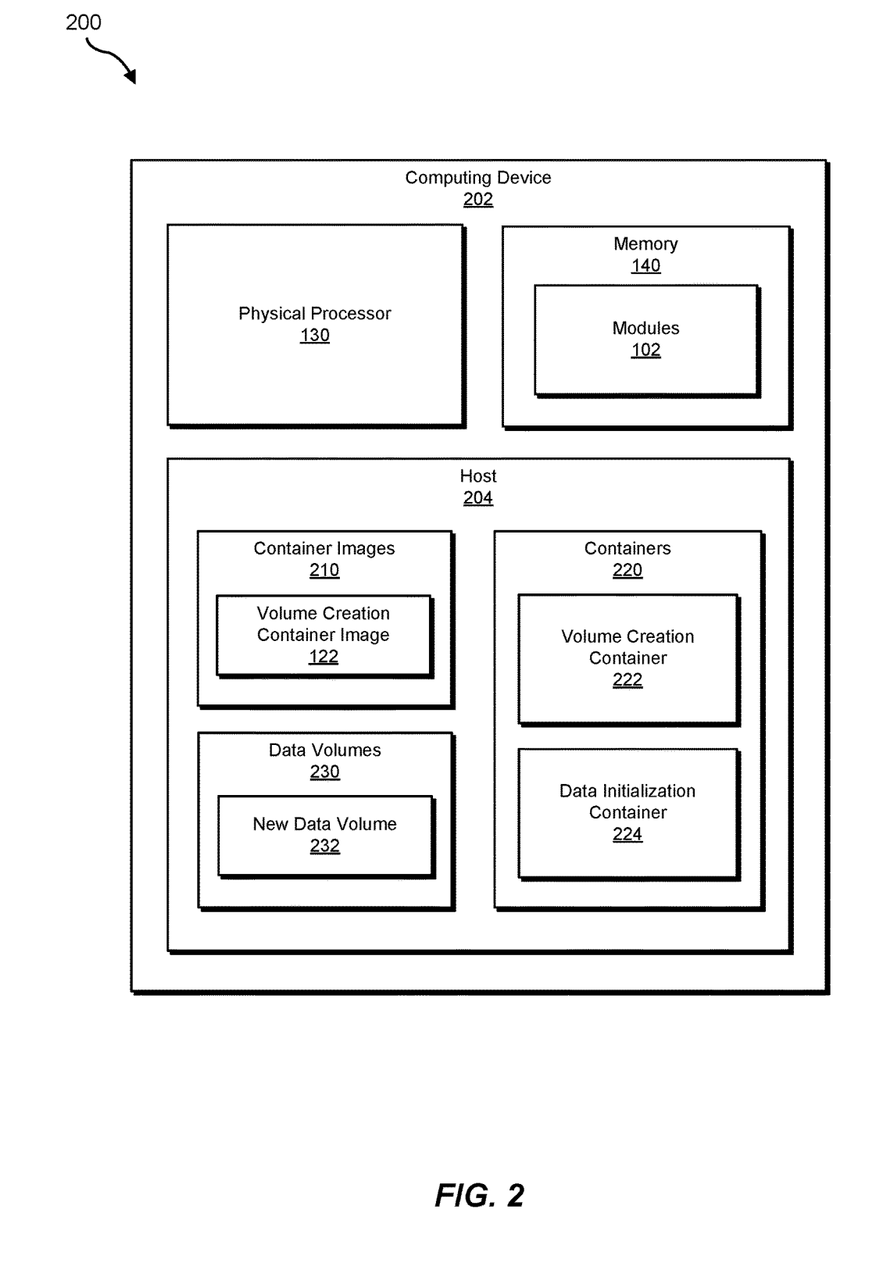
FIG. 2 is a block diagram of an additional exemplary system for creating a data volume from within a software container and initializing the data volume with data.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102. All or a portion of the functionality of modules 102 may be performed by computing device 202, and/or any other suitable computing system. As will be described in greater detail below, one or more of modules 102 from FIG. 1 may, when executed by at least one processor of computing device 202, enable computing device 202 to create a data volume from within a software container and initializing the data volume with data.

Computing device 202 generally represents any type or form of computing device capable of reading computer-executable instructions. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device. In some embodiments, computing device 202 may represent an application server and/or database server configured to provide various database services and/or run certain software applications.

As shown in FIG. 2, computing device 204 may include a host 204 that hosts container images 210, containers 220, and data volumes 230. As will be explained in greater detail below, one or more data volumes 230 mounted to at least one of containers 220 may also be located on host 204. Container images 210 may include a volume creation container image 122. Containers 220 may include a volume creation container 222 and a data initialization container 224 that are each run from volume creation container image 122. In some embodiments, containers 220 may include one or more additional containers, including one or more additional containers that are run from volume creation container image 122. Data volumes 230 may include a new data volume 232. One or more of container images 210 may be created on and/or may reside locally on host 204. In some embodiments, one or more of container images 210 may be copied from a location external to host 204, such as an external image server or computing system.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
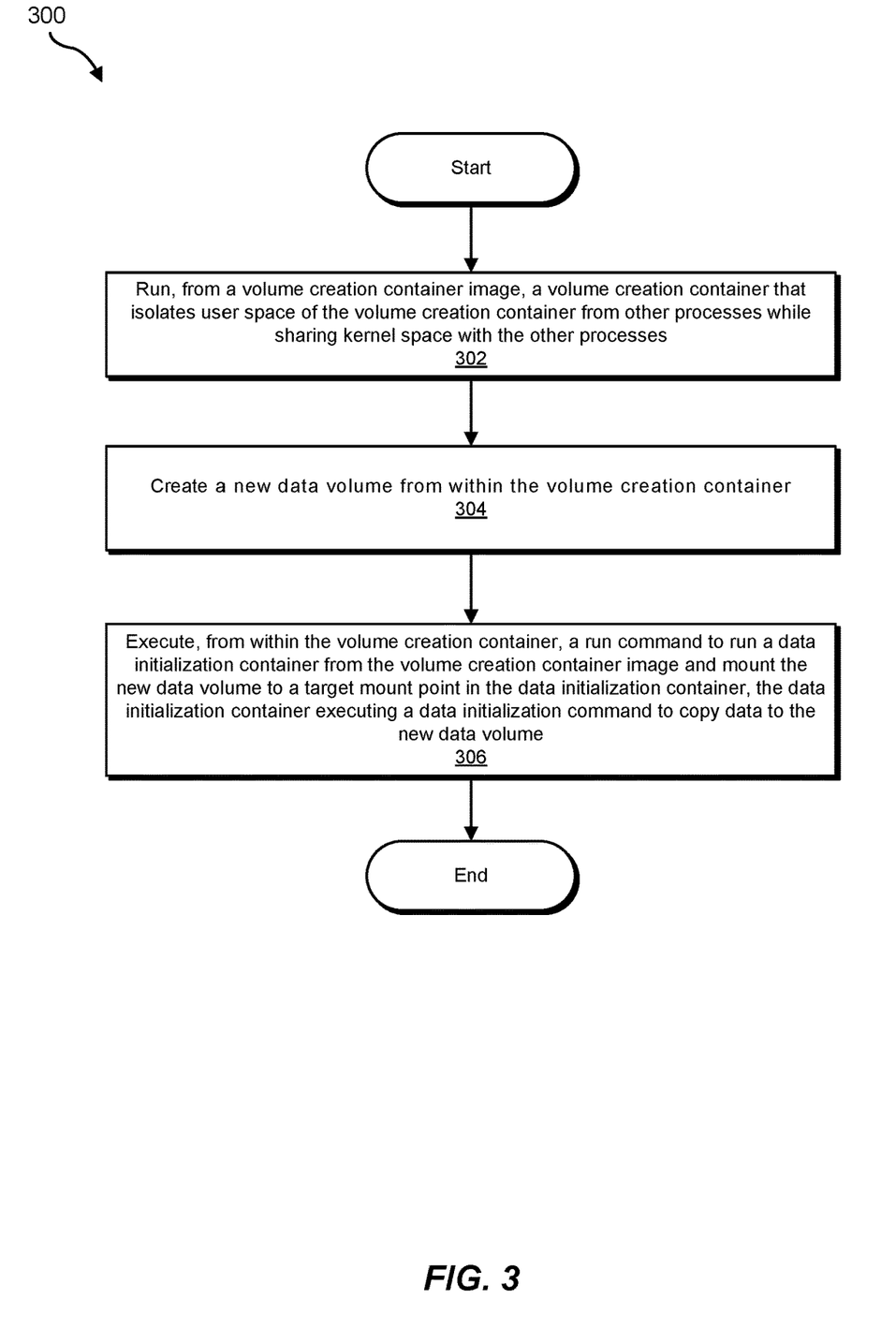
FIG. 3 is a flow diagram of an exemplary method for creating a data volume from within a software container and initializing the data volume with data.

FIG. 3 is a flow diagram of an example computer-implemented method 300 for creating a data volume from within a software container and initializing the data volume with data. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may run, from a volume creation container image, a volume creation container that isolates user space of the volume creation container from other processes while sharing kernel space with the other processes. For example, running module 104 may, as part of computing device 202 in FIG. 2, run, from volume creation container image 122, a volume creation container 222 that isolates user space of the volume creation container from other processes while sharing kernel space with the other processes.

Running module 104 may run volume creation container 222 in a variety of ways. For example, running module 104 may run volume creation container 222 from volume creation container image 122 using run command. The run command may be entered by a user or may be entered by, for example, an application or program, such as an automated program. Volume creation container image 122 may include a virtual filesystem and parameters that are utilized by volume creation container 222 during runtime. The filesystem may include data, such as a static data list, that is to be copied to a new data volume 232 created from within volume creation container 222.

Volume creation container 222 may run one or more applications to perform actions related to creating a new data volume, such as new data volume 232, and initializing the new data volume with data. In a least one embodiment, volume creation container 222 may run at least one script file and/or binary executable file that performs various actions from within volume creation container 222, such as executing a series of commands and/or applications. The at least one script may be written in any suitable scripting language (e.g., BASH). In some embodiments, actions performed by the at least one script from within volume creation container 222 may be changed based on one or more parameters that are passed to volume creation container 222 during execution of a run command to run volume creation container 222 from volume creation container image 122. In some embodiments, a socket may be mounted into volume creation container 222 so that volume creation container 222 is able to communication with a container engine (e.g., DOCKER ENGINE) application program interface (API).

Figure 4:
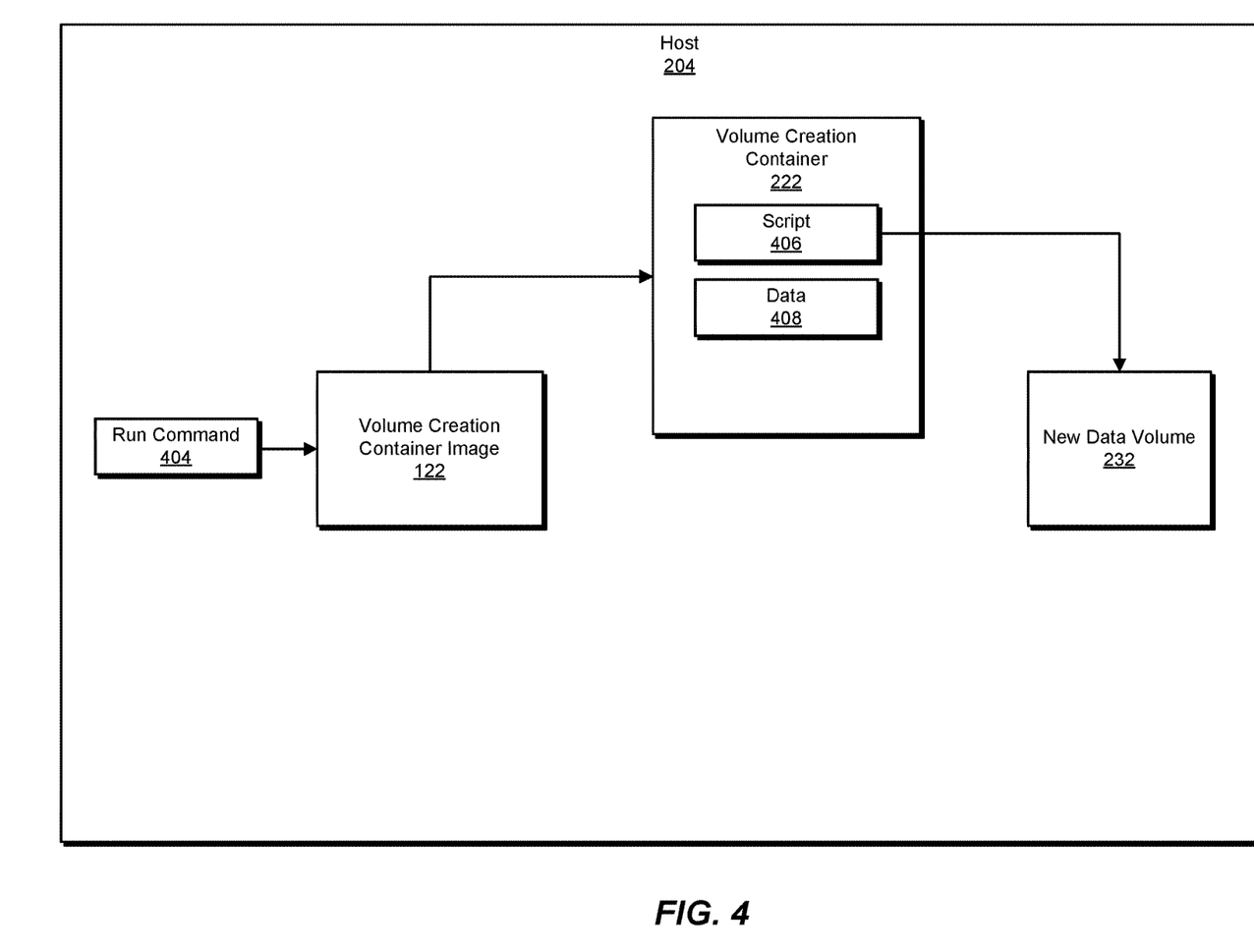
FIG. 4 is a block diagram of an exemplary system for creating a data volume from within a software container and initializing the data volume with data.
Figure 5:
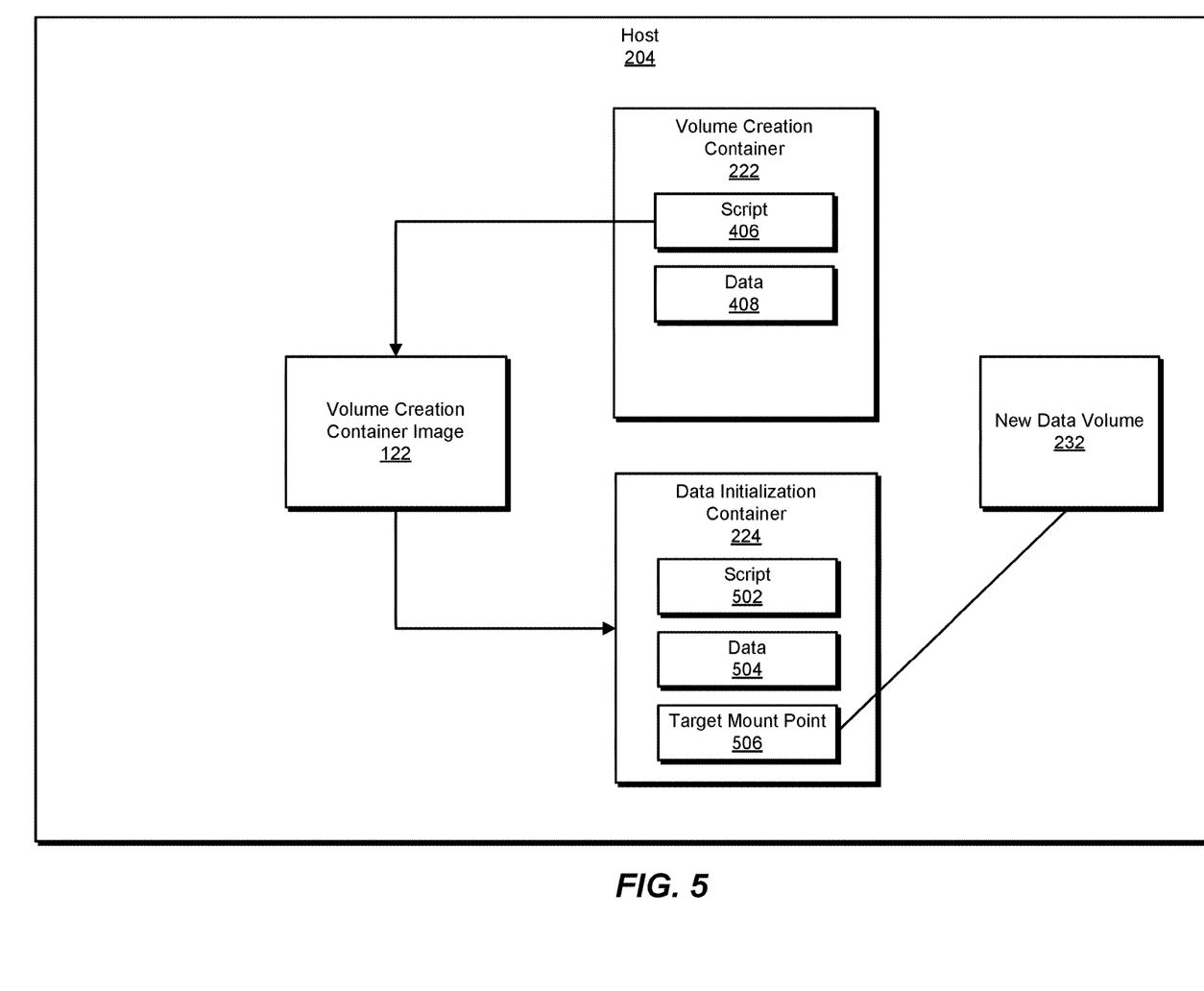
FIG. 5 is a block diagram of an exemplary system for creating a data volume from within a software container and initializing the data volume with data.
Figure 6:
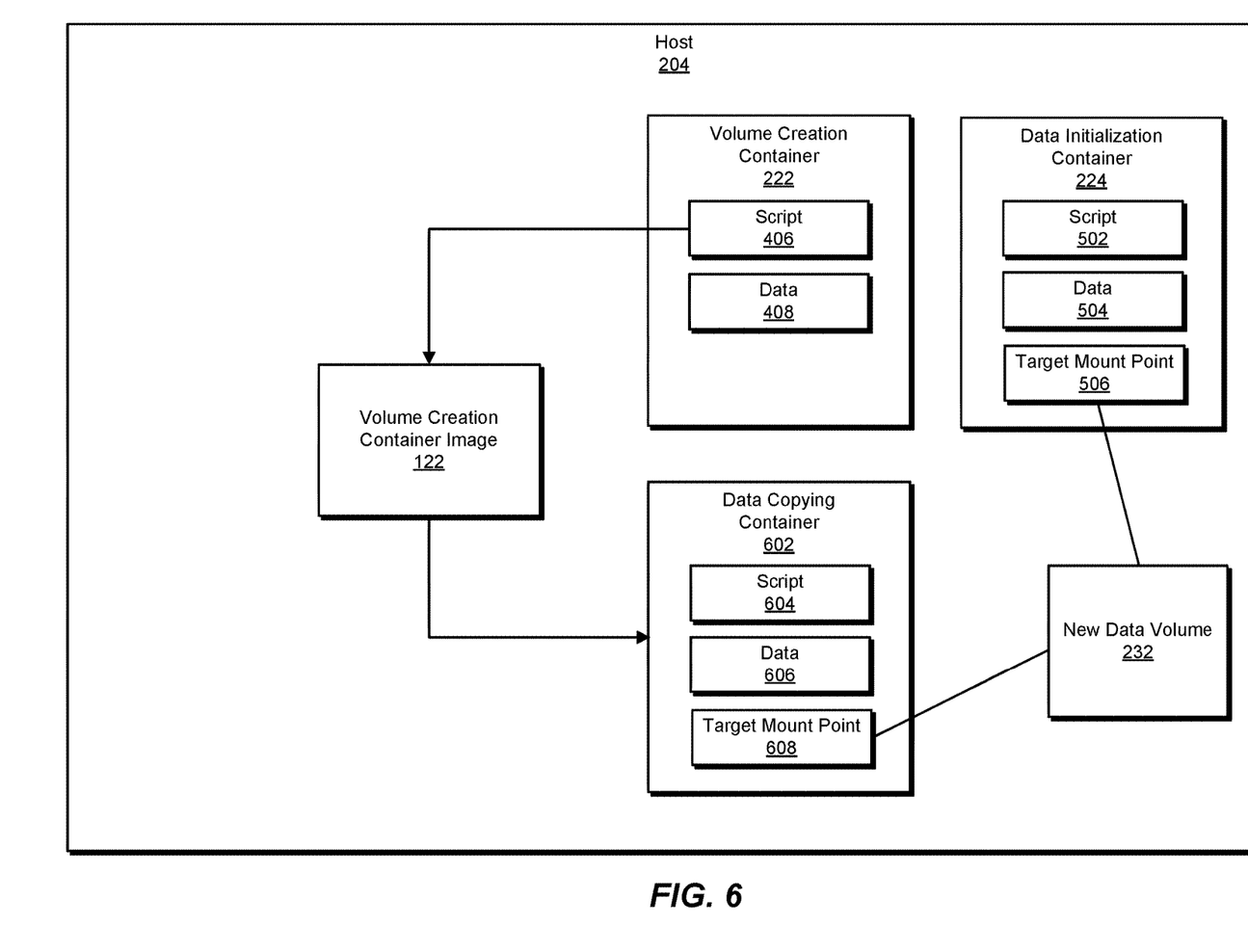
FIG. 6 is a block diagram of an exemplary system for creating a data volume from within a software container and initializing the data volume with data.

FIGS. 4-6 illustrate an exemplary system for creating a data volume from within a software container and initializing the data volume with data. As shown in FIG. 4, the system may include a host 204 that includes a volume creation container image 122. Volume creation container 222 may be run from volume creation container image 122 on host 204. For example, a run command 404 may be executed to run volume creation container 222 from volume creation container image 122. Volume creation container 222 may include a script 406 for executing various actions from within volume creation container 222 and data 408 to be copied into a newly created a data volume, such as new data volume 232, for purposes of initializing the new data volume with data. In some embodiments, data 408 may be data included in volume creation container image 122 that is transferred to volume creation container 222 when volume creation container 222 is started up. In additional embodiments, data 408 may be data that is received by volume creation container 222 from another source.

Returning to FIG. 3, at step 304 one or more of the systems described herein may create a new data volume from within the volume creation container. For example, creation module 106 may, as part of computing device 202 in FIG. 2, create a new data volume 232 from within volume creation container 222.

Creation module 106 may create new data volume 232 from within volume creation container 222 in a variety of ways. For example, a script running within creation container 222 may execute a volume creation command to create new data volume 232. New data volume 232 may include a specially-designated host directory that is separate from the file system of any containers. New data volume 232 may be located on host 204 or any other suitable location, such as a separate host. In some embodiments, the location of new data volume 232 may be specified and/or determined by creation module 106. The location of new data volume 232 may be utilized to mount new data volume 232 to one or more containers. As shown, for example, in FIG. 4, script 406 running in volume creation container 222 may execute a volume creation command to create new data volume 232.

In at least one embodiment, the systems and methods described herein may determine, from within the volume creation container, a container identifier for the volume creation container. For example, determining module 108 may, as part of computing device 202 in FIG. 2, determine a container identifier for volume creation container 222. Determining module 108 may, for example, use an environment variable (e.g., $HOSTNAME in BASH) to determine a unique container identifier for volume creation container 222. The unique container ID for volume creation container 222 may be generated at the time that volume creation container is started up. For example, a unique container identifier may be randomly generated when volume creation container 222 is started. In one embodiment, the container identifier for volume creation container 222 may be, for example, a random identifier such as a universally unique identifier (UUID). In some embodiments, the determined container identifier for volume creation container 222 may be an abbreviated container identifier (e.g., an abbreviated UUID).

In some embodiments, the systems and methods described herein may inspect, from within the volume creation container, the volume creation container image based on the container identifier to obtain an image identifier for the volume creation container image. For example, inspecting module 110 may, as part of computing device 202 in FIG. 2, inspect volume creation container image 122 based on the determined container identifier for volume creation container 222 in order to obtain an image identifier for volume creation container image 122. Inspecting module 110 may, for example, use a command line interface (e.g., DOCKER CLI) to inspect volume creation container image 122 using the determined container identifier for volume creation container 222. The command line interface may return metadata that includes a unique image identifier and/or name for volume creation container image 122. In various embodiments, the unique image identifier may be a randomly generated string, such as, for example, a UUID.

At step 306 one or more of the systems described herein may execute, from within the volume creation container, a run command to run a data initialization container from the volume creation container image and mount the new data volume to a target mount point in the data initialization container, the data initialization container executing a data initialization command to copy data to the new data volume. For example, executing module 112 may, as part of computing device 202 in FIG. 2, execute, from within volume creation container 222, a run command to run data initialization container 224 from volume creation container image 122 and mount the new data volume to a target mount point in data initialization container 224, and data initialization container 224 may execute a data initialization command to copy data to new data volume 232. In at least one embodiment, executing module 112 may, as part of computing device 202 in FIG. 2, execute, from within data initialization container 224, the data initialization command to copy data to new data volume 232.

Executing module 112 may execute the run command to run data initialization container 224 from volume creation container image 122 and mount the new data volume to the target mount point in data initialization container 224 in a variety of ways. For example, a script file running in volume creation container 222 may execute the run command to start data initialization container 224 from volume creation container image 122, which is also being utilized to run volume creation container 222. In some embodiments, executing the run command to run data initialization container 224 from volume creation container image 122 may include utilizing the obtained image identifier to locate volume creation container image 122 on host 204. Data initialization container 224 may be run while volume creation container 222 is still running.

Because data initialization container 224 is run from the same container image (i.e., volume creation container image 122) as volume creation container 222, one or more parameters or flags may be passed to data initialization container 224 to ensure that data initialization container 224 carries out one or more actions that differ from actions performed by volume creation container 222. For example, a script running in volume creation container 222 may pass one or more command line options or environment variables to data initialization container 224 at the time that data initialization container 224 is started up. At least one parameter or flag passed to data initialization container 224 may cause executing module 112 to execute a data initialization command from within data initialization container 224 to initialize new data volume 232 with data. In one embodiment, at least one parameter or flag passed to data initialization container 224 may cause executing module 112 to execute the data initialization command from within data initialization container 224 instead of a volume creation command executed from within volume creation container 222.

In at least one embodiment, a flag or parameter passed to data initialization container 224 may cause a script running in data initialization container 224 to carry out one or more command that differ from a script running in volume creation container 222. For example, volume creation container 222 and data initialization container 224 may each run one or more identical script files. However, parameters passed to data initialization container 224 during startup may cause a script file in data initialization container 224 to execute one or more commands that differ from commands executed by a script file running in volume creation container 222. In some embodiments, a script file running in volume creation container 222 may execute a command to create new data volume 232. One or more parameters passed to data initialization container 224 may cause a script running in data initialization container 224 to not create another new data volume. Additionally, the one or more parameters passed to data initialization container 224 may cause the script running in data initialization container 224 to populate new data volume 232 with data. For example, the script running in data initialization container 224 may copy data from data initialization container 224 to new data volume 232, which is mounted to data initialization container 224.

FIG. 5 illustrates additional aspects of the exemplary system shown in FIG. 4. As shown in FIG. 5, script 406 running in volume creation container 222 may execute a command to run data initialization container 224 from volume creation container image 122 on host 204. In some embodiments, data initialization container 224 may be run on a separate host from host 204. Data initialization container 224, which is run from the same volume creation container image 122 as volume creation container 222, may include a script 502, which is the same as script 406 in volume creation container 222, and data 504, which is the same as data 408 in volume creation container 222. However, script 502 in data initialization container 224 may utilize one or more parameters or flags passed to data initialization container 224 by script 406 in volume creation container 222 to execute one or more commands that are different from one or more commands executed by script 406.

For example, during startup of data initialization container 224, script 406 in volume creation container 222 may mount new data volume 232 to target mount point 506 in data initialization container 224. To mount new data volume 232 to target mount point 506, script 406 in volume creation container 222 may execute a volume mount command in conjunction with the command to run data initialization container 224. The volume mount command may mount new data volume 232 at a directory path within host 204 that is within data initialization container 224 and/or at a path that is otherwise visible to script 502 running within data initialization container 224. At least one parameter or flag passed by script 406 running in volume creation container 222 to data initialization container 224 may cause script 502 running in data initialization container 224 to not execute or bypass a command in script 502 to create another new data volume. Additionally, the at least one parameter or flag passed by script 406 to data initialization container 224 may cause script 502 running in data initialization container 224 to execute a command to copy data 504 to new data volume 232 at target mount point 506, thereby initializing new data volume 232 with data 504.

In at least one embodiment, one or more of the systems described herein may execute, from within the volume creation container or the data initialization container, an additional run command to run a data copying container from the volume creation container image and mount the new data volume to a target mount point in the data copying container, the data copying container executing a copy command to copy additional data from a data source outside the data copying container to the new data volume. For example, executing module 112 may, as part of computing device 202 in FIG. 2, execute, from within volume creation container 222 or data initialization container 224, an additional run command to run a data copying container from volume creation container image 122 and mount new data volume 232 to a target mount point in the data copying container. Additionally, executing module 112 may, as part of computing device 202 in FIG. 2, execute, from within the data copying container, a copy command to copy additional data from a data source outside the data copying container to the new data volume.

FIG. 6 illustrates additional aspects of the exemplary system shown in FIGS. 4 and 5. Script 406 running in volume creation container 222 or script 502 running in data initialization container 224 may execute a command to run data copying container 602 from volume creation container image 122 on host 204. In some embodiments, data copying container 602 may be run on a separate host from host 204. Data copying container 602, which is run from the same volume creation container image 122 as volume creation container 222 and data initialization container 224, may include a script 604, which is the same as script 406 and 502 in volume creation container 222, and data 606, which is the same as data 408 in volume creation container 222 and data 504 in data initialization container 224. However, script 604 in data copying container 602 may utilize one or more parameters or flags passed by script 406 in volume creation container 222 or script 502 in data initialization container 224 to execute one or more commands that differ from one or more commands executed by script 406 and script 502.

For example, during startup of data copying container 602, script 406 or script 502 may mount new data volume 232 to target mount point 608 in data copying container 602. At least one parameter or flag passed by script 406 or script 502 to data copying container 604 may cause script 604 running in data copying container 602 to not execute a command in script 604 to create another new data volume and to not execute a command in script 604 to initialize new data volume 232 with data 606 (new data volume 232 was previously initialized with data 504 by script 502 running in data initialization container 224). Additionally, the at least one parameter or flag passed by script 406 or script 502 to data copying container 602 may cause script 604 running in data copying container 604 to execute a command to copy additional data to new data volume 232 at target mount point 608. For example, script 604 may execute a command to copy data to new data volume 232 from another source (e.g., an external source), such as another data volume on host 204 or any other host, a container (other than volume creation container 222, data initialization container 224, or data copying container 602), a web address, a database (e.g., a data warehouse, a data store, a data mart, a distributed file system, such as a Hadoop Distributed File System (HDFS), an object-based storage system, etc.), and/or any other suitable data source.

In some embodiments, once new data volume 232 is initialized with data 504 and/or populated with data from one or more sources (e.g., external sources), then one or more of the containers used to create new data volume 232 and/or copy data to new data volume 232 may be exited. For example, volume creation container 222, data initialization container 224, and/or data copying container 602 may be exited. In at least one embodiment, after script 502 running in data initialization container 224 initializes new data volume 232 with data 504, script 502 may exit and data initialization container 224 may then exit. After data initialization 224 container exits, script 406 running in volume creation container 222 may exit and volume creation container 222 may then exit. In some embodiments, after script 604 running in data copying container 224 copies data to new data volume 232, script 604 may exit and data copying container 602 may then exit. New data volume 232, which is initialized with data, may remain within a directory on host 204 and/or any other suitable host and may be subsequently utilized by another container by mounting new data volume 232 to the container.

As described in connection with method 300 above, the systems and methods described herein may solve a problem of dynamic volume creation and initialization of created volumes with data by utilizing a new container image, such as a DOCKER image, that has data (e.g., an internal static data list) embedded within it and that creates a new data volume and initializes the new data volume with the embedded data. The creation of one or more containers from the new container image may be repeated, following initialization of the new data volume with the embedded data, so that additional data is copied to the new data volume from a dynamically and/or programmatically generated list that is obtained from any accessible source, such as another data volume, a database, a web address, such as a uniform resource locator (URL), or any other suitable data source.

In one embodiment, a DOCKER container may be started from a container image and volume map in, for example a /var/run/docker.sock file, so that the DOCKER container can communicate with a DOCKER ENGINE API, which is the core of the DOCKER containerization platform. The DOCKER container may start by running a script. The script may execute a command to create a new DOCKER volume. The script may then use, for example, a $HOSTNAME environment variable to get the unique (though abbreviated) container ID for the locally running DOCKER container. The script may then use the DOCKER CLI to inspect the container image based on the unique container ID and get the container image ID and/or name from the returned metadata. In other words, after creating the new DOCKER volume, the script may obtain the ID and/or name of the container image its DOCKER container is running off of. This image ID and/or name may also be passed as a parameter or set as an environment variable, particularly if it is desired to use a different image to copy the data to the new data volume.

The script in the DOCKER container may then run a new DOCKER container based on the initial DOCKER container's image. When script in the initial DOCKER container runs the new DOCKER container, the script may map in the new data volume. While the target mount point in the new data volume be static, it could alternatively be defined through a parameter to the script running in the new DOCKER container. Since the same container image, which includes the same script files, is used for both the initial DOCKER container and the new DOCKER container, a parameter (e.g., —data-only) may be passed to the new DOCKER container so that the new instance of the script in the new DOCKER container knows that it should only copy data to the new data volume's mount point (not create a volume and start a new container). When the script in the new DOCKER container is done, it may exit and then the new DOCKER container may exit. When the new DOCKER container exits, the initial script in the initial DOCKER container may exit and then the initial DOCKER container may exit.

Accordingly, the systems and methods described herein may facilitate efficient volume creation without requiring a user to use additional container images to initialize new volumes with data. Rather, a single volume creation container image may be used to both create a new data volume and to initialize the new data volume with data by running multiple containers from the volume creation container image. Accordingly, the described systems and methods do not require additional container images to be created, stored, and run, thereby utilizing minimal system resources required to populate a new data volume with data. In some embodiments, the same volume creation container image may be further utilized to run another container that copies additional data to the new data volume from one or more external sources (e.g., a database, a web address, etc.). The new data volume may be created and initialized with data without using routines requiring multiple runtime dependencies or manual mounting of existing volumes within a separate container. For example, a script or other file running in a volume creation container may pass a parameter or flag to another container (e.g., data initialization container and/or a data copying container) that causes the other container to copy data to the new data volume. Accordingly, the described systems and methods may facilitate dynamic and efficient volume creation for use in container-based environments While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for creating a data volume from within a software container and initializing the data volume with data, at least a portion of the method being performed by a computing device comprising at least one processor, the method comprising:
   running, from a volume creation container image, a volume creation container comprising a virtual environment that isolates user space of the volume creation container from other processes while sharing kernel space with the other processes;
   creating a new data volume from within the volume creation container; and
   executing, from within the volume creation container, a run command to run a data initialization container from the volume creation container image and mount the new data volume to a target mount point in the data initialization container, the data initialization container executing a data initialization command to copy data to the new data volume;
   wherein user space of the volume creation container is isolated from user space of the data initialization container.

2. The computer-implemented method of claim 1, further comprising:
   determining, from within the volume creation container, a container identifier for the volume creation container; and
   inspecting, from within the volume creation container, the volume creation container image based on the container identifier to obtain an image identifier for the volume creation container image.

3. The computer-implemented method of claim 2, wherein executing the run command to run the data initialization container from the volume creation container image comprises utilizing the image identifier to locate the volume creation container image.

4. The computer-implemented method of claim 1, wherein running the volume creation container further comprises running a script within the volume creation container.

5. The computer-implemented method of claim 4, wherein the script executes the run command to run the data initialization container from the volume creation container image and mount the new data volume to the target mount point in the data initialization container.

6. The computer-implemented method of claim 4, wherein running the data initialization container further comprises running another instance of the script within the data initialization container.

7. The computer-implemented method of claim 1, wherein the data initialization container is run while the volume creation container is running.

8. The computer-implemented method of claim 1, wherein creating the new data volume comprises executing, from within the volume creation container, a volume creation command.

9. The computer-implemented method of claim 1, wherein executing the run command to run the data initialization container from the volume creation image and mount the new data volume to the target mount point in the data initialization container further comprises passing a parameter that is utilized by the data initialization container to execute the data initialization command.

10. The computer-implemented method of claim 9, wherein the parameter is utilized by the data initialization container to execute the data initialization command instead of a volume creation command.

11. The computer-implemented method of claim 1, wherein the data copied to the new data volume comprises data included in the volume creation container image.

12. The computer-implemented method of claim 1, further comprising executing, from within the volume creation container or the data initialization container, an additional run command to run a data copying container from the volume creation container image and mount the new data volume to a target mount point in the data copying container, the data copying container executing a copy command to copy additional data from a data source outside the data copying container to the new data volume.

13. The computer-implemented method of claim 12, wherein executing the additional run command to run the data copying container from the volume creation container image and mount the new data volume to the target mount point in the data copying container further comprises passing a parameter that is utilized by the data copying container to execute the copy command.

14. A system for creating a data volume from within a software container and initializing the data volume with data, the system comprising:
   a running module, stored in memory, that runs, from a volume creation container image, a volume creation container comprising a virtual environment that isolates user space of the volume creation container from other processes while sharing kernel space with the other processes;
   a creation module, stored in memory, that creates a new data volume from within the volume creation container;
   an executing module, stored in memory, that executes, from within the volume creation container, a run command to run a data initialization container from the volume creation container image and mount the new data volume to a target mount point in the data initialization container, the data initialization container executing a data initialization command to copy data to the new data volume; and
   at least one physical processor that executes the running module, the creation module, and the executing module;
   wherein user space of the volume creation container is isolated from user space of the data initialization container.

15. The system of claim 14, wherein:
   the system further comprises:
      a determining module, stored in memory, that determines, from within the volume creation container, a container identifier for the volume creation container; and
      an inspecting module, stored in memory, that inspects, from within the volume creation container, the volume creation container image based on the container identifier to obtain an image identifier for the volume creation container image; and
   the physical processor further executes the determining module and the inspecting module.

16. The system of claim 15, wherein the executing module executes the run command to run the data initialization container from the volume creation container image by utilizing the image identifier to locate the volume creation container image.

17. The system of claim 14, wherein the data initialization container is run while the volume creation container is running.

18. The system of claim 14, wherein the data copied to the new data volume comprises data included in the volume creation container image.

19. The system of claim 14, wherein the executing module further executes, from within the volume creation container or the data initialization container, an additional run command to run a data copying container from the volume creation container image and mount the new data volume to a target mount point in the data copying container, the data copying container executing a copy command to copy additional data from a data source outside the data copying container to the new data volume.

20. A non-transitory computer-readable medium comprising one or more computer-executable instructions that, when executed by at least one processor of a computing device, cause the computing device to:

run, from a volume creation container image, a volume creation container comprising a virtual environment that isolates user space of the volume creation container from other processes while sharing kernel space with the other processes;

create, a new data volume from within the volume creation container; and execute, from within the volume creation container, a run command to run a data initialization container from the volume creation container image and mount the new data volume to a target mount point in the data initialization container, the data initialization container executing a data initialization command to copy data to the new data volume;

wherein user space of the volume creation container is isolated from user space of the data initialization container.

* * * * *